July 4, 1933.                    G. McNAB                     1,916,804
                                STERILIZER
                            Filed Oct. 8, 1931
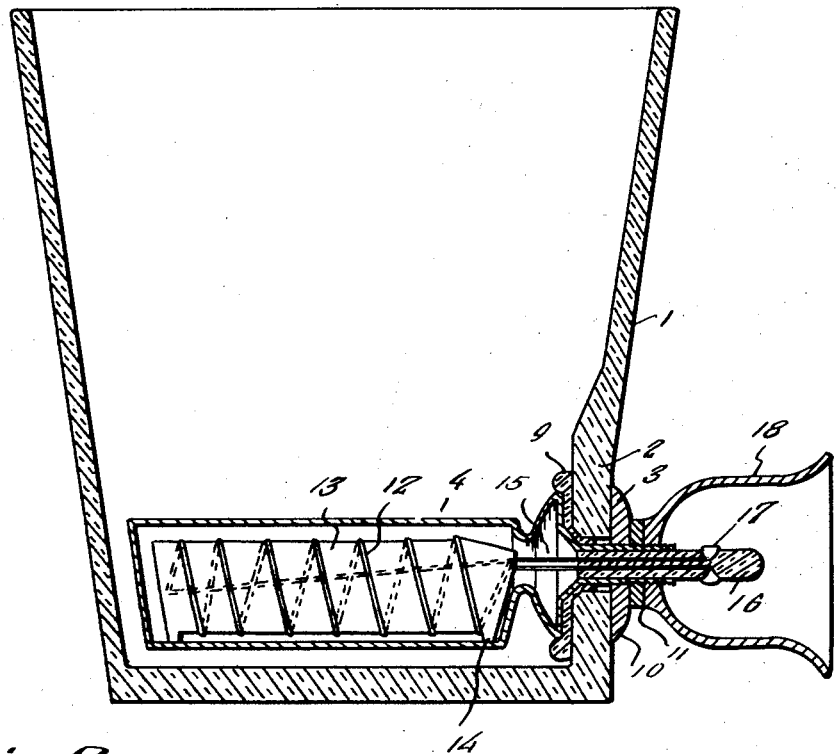
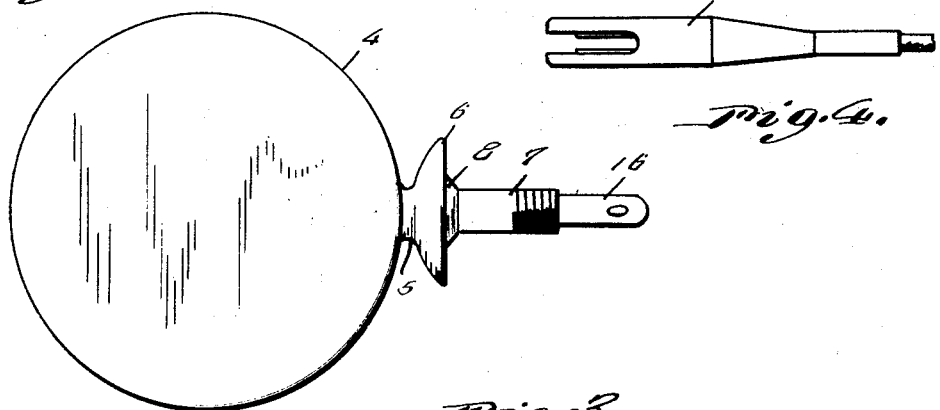
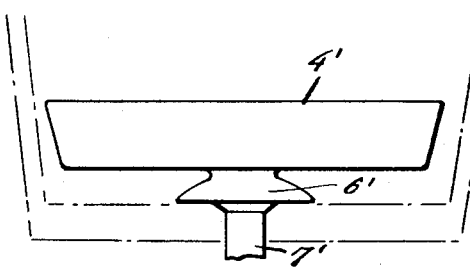
Inventor
Gordon McNab
By Clarence A. O'Brien
Attorney Patented July 4, 1933

1,916,804

UNITED STATES PATENT OFFICE

GORDON McNAB, OF BRITTON, SOUTH DAKOTA

STERILIZER

Application filed October 8, 1931. Serial No. 567,708.

This invention relates to a sterilizer, the general object of the invention being to provide a portable sterilizer, preferably formed of a glass bowl and having electric heating means therein, of such a character that the liquid in the bowl will be almost instantaneously heated when the current is turned on, with the shape of the heating unit being such that danger of dulling the edges of cutting tools or the like or injuring other tools is eliminated, with means whereby the heating unit can be easily removed for cleaning or repair purposes when necessary.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a sectional view through the invention.

Fig. 2 is a top plan view of the heating unit.

Fig. 3 is a view showing a connector for connecting the conductors of the unit with a source of supply.

Fig. 4 is a view of a further modification.

In the drawing, the numeral 1 indicates a bowl which is preferably formed of glass and of heat resisting qualities, and which is formed with a subtantially straight enlarged part 2 at its lower part, through which an opening 3 passes, which is formed with a countersink at its inner end. The heating unit consists of a substantially circular part 4, having a stem 5 extending from one part thereof, which is formed with a hollow enlargement 6 from which a stem 7 extends, the stem being connected with the flat outer face of the enlargement by a beveled part 8 which conforms to the countersunk part of the hole 2, it being of course understood that the stem is adapted to pass through the hole 3.

A washer 9 of fiber, rubber or the like, is placed between the inner wall of the enlargement 2 of the bowl and the flat face of the enlargement 6 of the casing 4 with a part of the washer extending into the hole 3 as shown in Fig. 1.

The stem 7 extends through an exterior washer 10 and a nut 11 is threaded to the outer part of the stem and presses the washer against the exterior wall of the enlargement 2 for holding the parts in place. The coil 12 passes around the body 13, of non-conducting material which is located in the casing 4 and has the bottom projections 14 resting on the bottom of the casing, so that the part of the body around which the coil passes, is spaced from the bottom of the casing.

The ends 15 of the coil pass through a plug 16 of non-conducting material which is inserted in the stem 7 and partly projects therefrom, and the outer ends of the wires 15 are connected to the contacts 17 carried by the plug adjacent its outer end. A substantially cup-shaped member 18 is threaded on the outer end of the stem 7 and encloses the plug so that a connector such as shown at 19 in Fig. 4 can be partly placed in the cup 18 over the plug 16 to engage the contacts 17 to supply current to the coil.

As shown in Fig. 2, the casing 4 is substantially of circular shape, so as to form a flat surface in the bowl upon which articles placed in the bowl may rest without danger of the heating unit dulling the cutting edges of cutting instruments or damaging other instruments.

The heating unit can readily be removed from the bowl by removing the cup 18, the nut 11 and the washer 10 and instead of having the stem 7 passed through a hole in the side of the bowl, said stem may pass through a hole in the bottom of the bowl, as shown at 7' in Fig. 3. Of course, in this case, the stem is connected to the bottom of the casing 4' as is the enlargement 6' of the casing.

This device is particularly suitable for the use of barbers, beauty parlors, doctors, dentists, and the like, and can be used in hospitals and nurseries, as the device can be readily moved from place to place and it provides simple means for almost instantly heating the liquid placed therein.

By making the bowl of glass, the contents are visible and the parts can be easily taken apart and cleaned. It may be constructed for use on either alternating or direct current.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. A sterilizer for instruments and the like comprising a receptacle having an open top and an opening in a lower wall thereof, a casing located in the lower part of the receptacle and having its bottom spaced from the bottom of the receptacle and its sides slightly spaced from the sides of the receptacle, the upper face of the casing being flat to support articles without injuring the article, the stem connected with the casing and passing through the hole in the receptacle, said stem having an enlargement adjacent its inner end having a flattened outer face, a gasket located between said face and part of the internal wall of the receptacle, a nut on the outer end of the stem for removably holding the stem in the hole, a coil in the casing, a supporting member for the coil located in the casing, the ends of the coil passing through the stem and a plug extending into the stem and having contacts thereon with which the ends of the coil are connected.

2. A sterilizer of the class described comprising a glass bowl having its top open and a hole in its lower wall thereof, the inner end of the hole being countersunk, a casing located in the lower part of the bowl and having its bottom slightly spaced from the bottom of the bowl and the sides slightly spaced from the sides of the bowl, the top of the casing being flat, a stem connected with the casing and passing through the hole in the bowl, said stem being of hollow construction and having an enlargement adjacent its inner end formed with a flattened outer face and a centrally arranged cone part for fitting in the countersunk, a gasket placed between the enlargement and a part of the internal wall of the bowl, a washer encircling the stem and engaging a part of an external wall of the bowl, a nut on the stem contacting the washer, a plug of non-conductive material extending into the stem having the parts projecting therefrom, contacts on said projecting part, a coil located in the casing with its ends passing through the stem and into the plug with their structures connected with the contact, a support for the coils located in the casing and having depending projections thereon resting on the bottom of the casing and a cup-shaped member carried by the outer end of the stem and receiving the outer part of the plug.

In testimony whereof I affix my signature.

GORDON McNAB.